(12) United States Patent
Tanaka

(10) Patent No.: US 7,407,028 B2
(45) Date of Patent: Aug. 5, 2008

(54) NAVIGATION-BASED SAFETY RESTRAINT SYSTEM AND METHOD

(75) Inventor: Yoshihiko Tanaka, Hikone (JP)

(73) Assignee: Takata Corporation, Tokyo (JP)

( * ) Notice: Subject to any disclaimer, the term of this patent is extended or adjusted under 35 U.S.C. 154(b) by 483 days.

(21) Appl. No.: 11/001,706

(22) Filed: Dec. 2, 2004

(65) Prior Publication Data

US 2005/0150704 A1 Jul. 14, 2005

Related U.S. Application Data

(60) Provisional application No. 60/526,078, filed on Dec. 2, 2003.

(51) Int. Cl.
*B60R 21/00* (2006.01)

(52) U.S. Cl. .......... 180/268; 280/735; 701/45; 342/72; 342/357.08

(58) Field of Classification Search .......... 342/72, 342/352, 357.06–357.09; 340/903, 991, 340/901, 904, 435, 436; 701/45, 2, 213, 701/301; 180/268; 280/735

See application file for complete search history.

(56) References Cited

U.S. PATENT DOCUMENTS

| | | | |
|---|---|---|---|
| 5,959,552 A * | 9/1999 | Cho | 340/903 |
| 6,268,804 B1 * | 7/2001 | Janky et al. | 340/903 |
| 6,459,961 B1 | 10/2002 | Obradovich et al. | |
| 6,483,452 B1 * | 11/2002 | Iwakini | 342/20 |
| 6,587,759 B2 | 7/2003 | Obradovich et al. | |
| 6,621,452 B2 | 9/2003 | Knockeart et al. | |
| 6,851,504 B2 * | 2/2005 | Campbell et al. | 180/271 |
| 6,865,457 B1 * | 3/2005 | Mittelsteadt et al. | 701/35 |
| 6,915,196 B2 * | 7/2005 | Rao et al. | 701/45 |
| 7,167,104 B2 * | 1/2007 | DiPiazza | 340/905 |
| 2003/0154009 A1 * | 8/2003 | Basir et al. | 701/35 |

FOREIGN PATENT DOCUMENTS

| | | |
|---|---|---|
| JP | 5-229378 | 9/1993 |
| JP | 2002-211355 | 7/2002 |
| JP | 2003-312439 | 11/2003 |

* cited by examiner

*Primary Examiner*—Christopher Bottorf
*Assistant Examiner*—Drew J. Brown
(74) *Attorney, Agent, or Firm*—Foley & Lardner LLP

(57) ABSTRACT

A safety restraint system for use in a vehicle. The system includes a safety restraint component coupled to a navigational module. The navigational module is adapted to determine a location of the vehicle. The component is adapted to be actuated in response to the determination. The safety restraint component may be a safety belt pretensioner. The component may be adapted to be actuated when the navigational module determines the vehicle has entered or is approaching a zone meeting a predefined criteria.

29 Claims, 6 Drawing Sheets

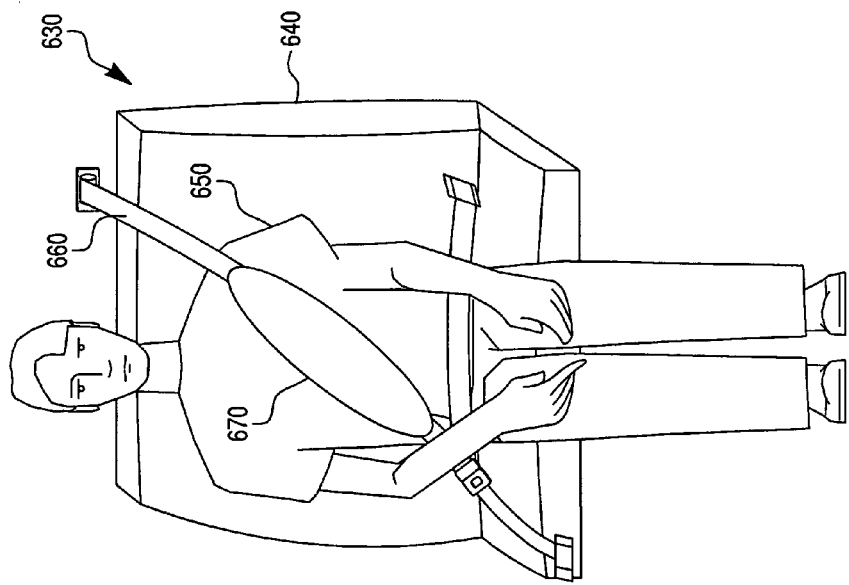
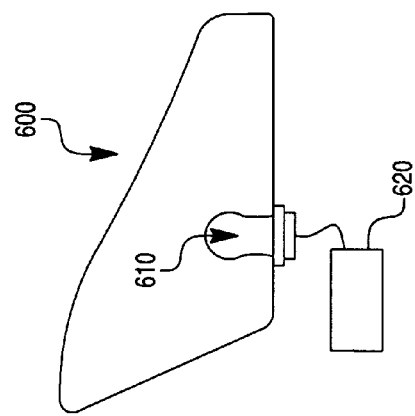
Fig. 6b
Fig. 6a

NAVIGATION-BASED SAFETY RESTRAINT SYSTEM AND METHOD

This application claims the benefit of Provisional Application No. 60/526,078, filed Dec. 2, 2003.

BACKGROUND

The present invention relates generally to the field of safety restraint systems. In particular, the invention relates to actuation of one or more components of a safety restraint system based on inputs from systems such as the navigational system or the vehicle monitoring system.

SUMMARY OF THE INVENTION

According to an embodiment of the present invention, a safety restraint system for a vehicle is provided. The system includes a safety restraint component coupled to a navigational module. The navigational module is adapted to determine a location of the vehicle. The component is adapted to be actuated in response to the location determination made by the module.

Another embodiment of the present invention proves a method of operating a safety restraint system a vehicle. The method includes the steps of determining a location of the vehicle; and actuating a safety restraint component in response to the location.

According to yet another embodiment of the present invention, an alternative safety restraint system for use in a first vehicle is provided. The system includes a safety restraint component coupled to a navigational module, the navigational module being adapted to determine a location of a second vehicle relative to the first vehicle. The safety restraint component is adapted to be actuated in response to the determination.

According to still another embodiment of the present invention, a safety restraint system for use in a vehicle is provided. The system includes a safety restraint component coupled to a vehicle monitoring system. The component is adapted to be actuated in response to a signal from the vehicle monitoring system, the signal being indicative of a predetermined condition of a non-SRS component.

It is to be understood that both the foregoing general description and the following detailed description are exemplary and exemplary only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 6A and 6B illustrate embodiments of SRS components adapted to be actuated according to various embodiments of the present invention.

DETAILED DESCRIPTION

Figure 1:
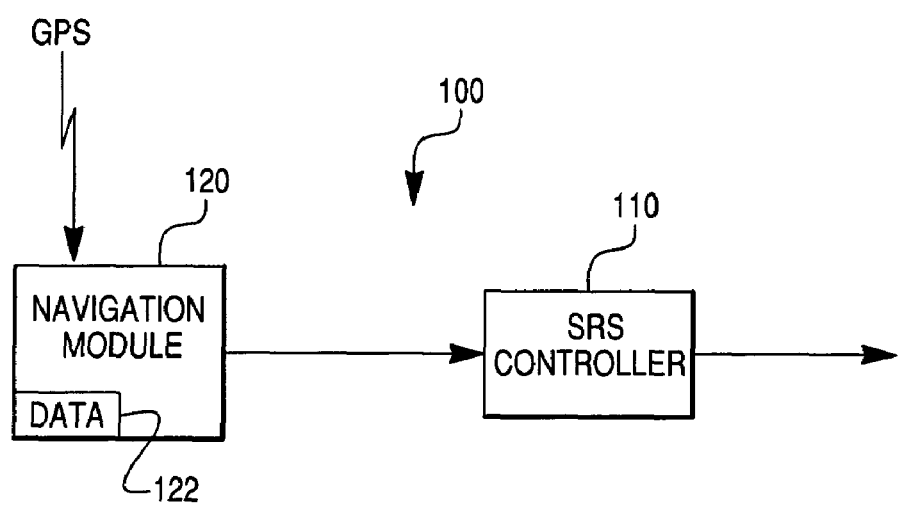
FIG. 1 is a schematic illustration of an embodiment of a safety restraint system according to the present invention.

Referring to FIG. 1, an embodiment of a safety restraint system in a vehicle, such as an automobile, according to the present invention is illustrated. The safety restraint system (SRS) 100 includes an SRS controller 110. The SRS controller 110 is adapted to monitor and actuate various components of the SRS 100. For example, the controller 110 may monitor whether the seat belt in the driver's seat is currently engaged and may actuate an alert, such as a warning light, if the seat belt is not engaged. In particular embodiments, the controller 110 is adapted to actuate various components of the SRS 100 such as, for example, a seat belt pretensioner, seat belt retractor or airbag. It will be understood by those skilled in the art that numerous other components may be actuated by the controller 110.

The controller 110 may be coupled to and adapted to receive signals and/or information from external sources. In the illustrated embodiment, the external source is a navigation module 120 provided within the vehicle. Such navigation modules are becoming commonplace in new automobiles and generally provide maps and present location information to the user. The controller 110 is configured to receive inputs from various sensors including, for example, occupant position sensors, seat weight sensors, vehicle acceleration and crash sensors, and the like.

The navigation module 120 may be a system based on the Global Positioning System (GPS) technology. In this regard, the navigation module 120 uses signals from the constellation of satellites forming GPS to determine the longitude and latitude of the vehicle, as well as elevation, if necessary. A system such as described in U.S. Pat. No. 6,621,452 (incorporated by reference herein in its entirety) may be employed, for example.

In one embodiment, the navigation module 120 combines the GPS-based location information with data 122 stored on the vehicle. In a preferred embodiment, the data 122 is stored in a memory section within the navigation module 120, as illustrated in FIG. 1. The data 122 may include information such as the location of certain facilities, such as hospitals, schools, toll booths, reduced-speed zones, etc. Thus, the information provided to the controller 110 by the navigation module 120 may integrate the GPS-based location information of the vehicle with location of fixed structures or landmarks.

In other embodiments, the navigation module 120 may include a cellular-based system. In this regard, the data 122 is not required to be carried on the vehicle. Rather, the navigation module 120 receives inputs from cellular transmitters identifying nearby fixed structures or landmarks, as well as information relating to the present location of the vehicle.

The navigation module 120 may be adapted to transmit a signal to the controller 110 upon entering or approaching a zone having a predefined criteria. The predefined criteria may include such factors as the existence of a school or a hospital within a predetermined distance (e.g., one mile) of the present position of the vehicle.

In other embodiments, the predefined criteria may be a reduced-speed zone having a speed limit that is below a predefined threshold or a predefined level below the current speed of the vehicle. Thus, the criteria may be satisfied if, for example, a speed zone of less than twenty-five miles-per-hour, or a speed zone with a speed limit that is more than ten miles-per-hour less than the current speed of the vehicle. The reduced-speed zone may correspond to any number of conditions such as, for example, a densely populated area or a winding road.

Figure 2:
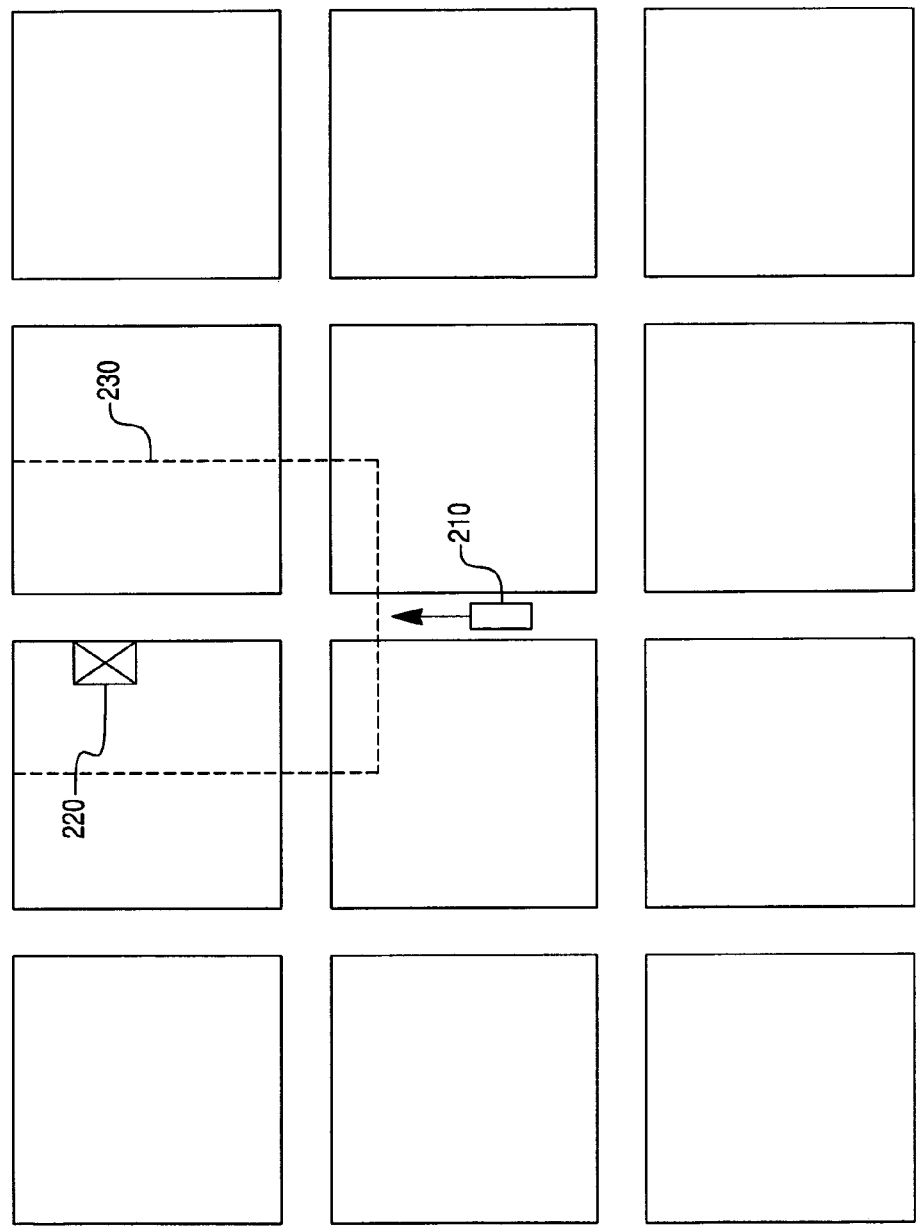
FIG. 2 illustrates the operation of the safety restraint system of FIG. 1.

FIG. 2 illustrates the operation of the SRS 100 shown in FIG. 1. A vehicle 210 equipped with an SRS according to an embodiment of the invention is shown traveling through an urban neighborhood in a direction indicated by the arrow. As it travels forward, the vehicle 210 approaches a structure 220, such as a school or a hospital. The navigation module identifies a zone 230 satisfying a predefined criteria. As the vehicle 210 approaches or enters the zone 230, the navigation module transmits a signal to the controller. The signal may be transmitted at a pre-determined point relative to the entry into the zone 230. For example, in one embodiment, the signal may be transmitted at the precise moment of entry into the zone 230, while in other embodiments, the signal may be transmitted in anticipation of entry into the zone within a pre-set period of time or distance.

Upon receiving the signal, the controller actuates one or more pre-selected components of the SRS. In a preferred embodiment, the controller actuates a pretensioner coupled to the driver's seat belt. The pretensioner operates to increase the tension on the seat belt. The actuation of the pretensioner may serve to alert the driver of the entry into the zone 230 and warn the driver to slow down. As discussed above, the zone 230 may also correspond to a reduced-speed zone independent of the existence of the structure 220.

Figure 3:
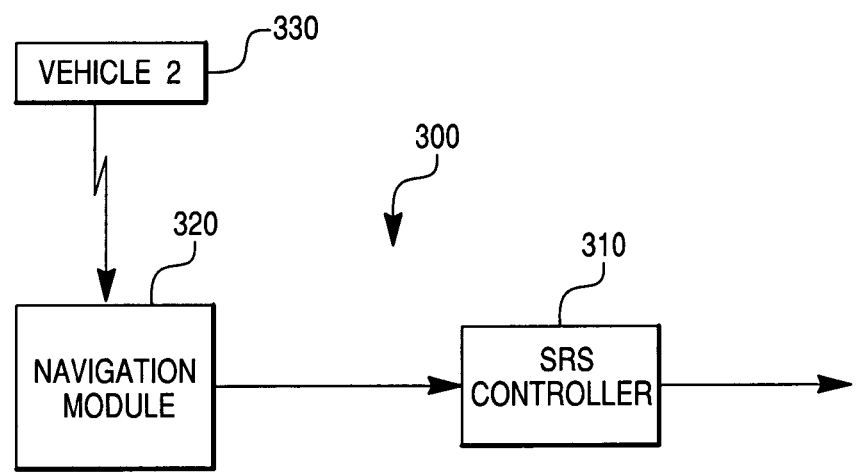
FIG. 3 is a schematic illustration of another embodiment of a safety restraint system according to the present invention.

In another embodiment, illustrated in FIG. 3, a SRS 300 may include a controller 310 adapted to receive information from an external source, such as a navigation module 320. The navigation module 320 is adapted to receive signals providing information relating to the location and velocity of nearby vehicles, such as a second vehicle 330. In this regard, the navigation module 320 is able to identify vehicles presenting a danger, for example.

The navigation module 320 may also be adapted to determine location and velocity information relating to its own vehicle. In certain embodiments, the navigation module 320 may be adapted to only determine relative position and velocity of nearby vehicles. In this regard, the navigation module 320 is not required to determine the actual position (e.g., latitude and longitude) of its own vehicle.

The signal providing information for the second vehicle 330 may be generated by, for example, a transponder located on the second vehicle 330, similar to most commercial airliners. In certain embodiments, the second vehicle 330 may transmit a signal when a turn signal is actuated by the driver.

Figure 4:
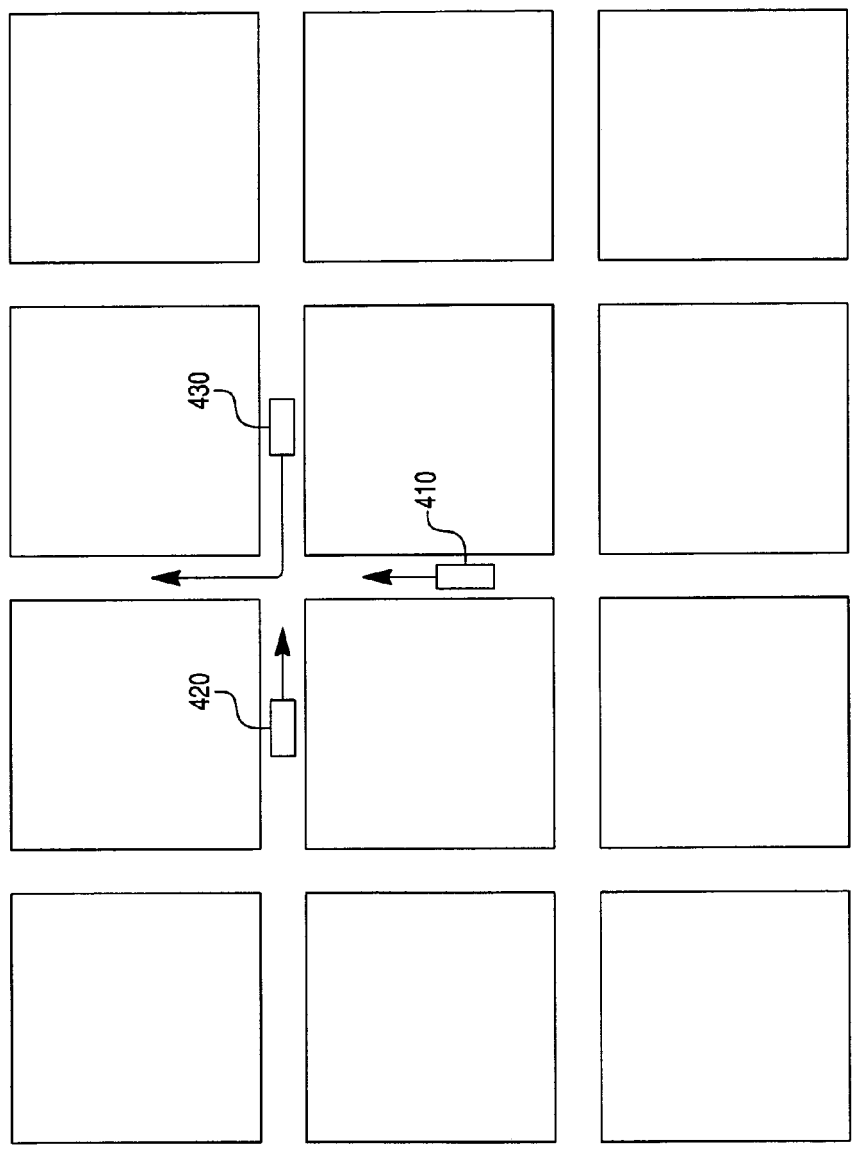
FIG. 4 illustrates the operation of the safety restraint system of FIG. 3.

FIG. 4 illustrates operation of the SRS 300 of FIG. 3. A vehicle 410 equipped with the SRS 300 is shown traveling through a city in a direction indicated by the arrow. As described above with reference to FIG. 3, the vehicle 410 includes a navigation module adapted to determine the position and velocity of nearby vehicles, such as vehicle 420 and vehicle 430. Each of these vehicles 420, 430 may represent a potential hazard to the vehicle 410, a hazard which may be hidden by obstacles in urban areas, such as buildings.

With reference to vehicle 420, the navigation module of vehicle 410 may determine that the location and velocity of the vehicle 420 from a transponder emitting a signal. The signal may be a simple chirp which announces the present location of the vehicle 420. Absent any other information, the navigation module of the vehicle 410 assumes that the vehicle 420 will continue along its current path. From this information, the navigation module may conclude that the vehicle 420 and the vehicle 410 are headed on a collision course at an intersection, which may be an uncontrolled intersection lacking traffic lights or signals. Based on this conclusion, the navigation module transmits a signal to the SRS controller of the vehicle 410, and the controller may cause actuation of an SRS component, such as a pretensioner of the driver's safety belt.

Alternatively, or in addition to, the SRS controller may change modes in order to ensure the prompt initiation of an airbag device upon the subsequent occurrence of a triggering event. Thus, for example, the SRS controller may assume a "high alert" mode from which the airbag device could be promptly deployed.

Regarding vehicle 430, the navigation module of the vehicle 410 may determine the position and velocity of the vehicle 430 based on a signal received from the vehicle 430, similarly to that received from vehicle 420 described above. Additionally, if the driver of the vehicle 430 has activated a turn signal, for example, the vehicle 430 may transmit that information through a signal transmission as well. For example, as illustrated in FIG. 4, the vehicle 430 may be transmitting a signal indicating that the right-turn signal has been activated.

The navigation module of the vehicle 410, receiving the signal or signals from the vehicle 430, determines not only the location and the current velocity of the vehicle 430, but also projects an upcoming right turn by the vehicle 430. Based on this information, the navigation module of the vehicle 410 may conclude that the vehicle 430 represents a hazard to the vehicle 410. Accordingly, the navigation module transmits a signal to the SRS controller, which may cause one or more SRS components to be actuated. For example, the pretensioner of the driver's safety belt may be actuated to alert the driver of the vehicle 410 of the potential hazard. According to another example, the controller may change control modes for airbag actuation to provide for reduced lead time prior to deployment. This feature is especially important for side collisions where the determination that a triggering event has occurred must be made in a shorter time than for frontal collisions due to shorter distance between the impact point on the vehicle and the occupant.

Figure 5:
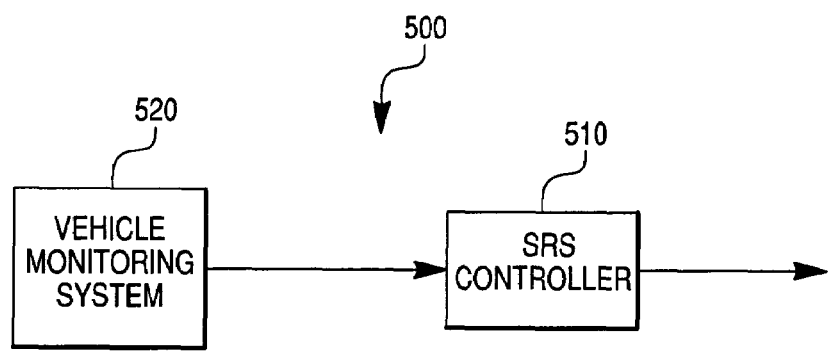
FIG. 5 is a schematic illustration of yet another embodiment of a safety restraint system according to the present invention.

In another embodiment, rather than a navigation module, a vehicle monitoring system may provide information to the SRS controller. As illustrated in FIG. 5, an embodiment of the SRS 500 includes an SRS controller 510 being coupled to a vehicle monitoring system 520. The vehicle monitoring system 520 may be coupled to various non-SRS components of the vehicle such as, for example, the fuel gauge or tire pressure gauge. In one embodiment, the vehicle monitoring system 520 transmits a signal to the controller 510 when a particular component of the vehicle requires attention. For example, a signal may be transmitted when the fuel level is below a predetermined threshold. Upon receiving this signal, the controller 510 may actuate an SRS component, such as a driver seat-belt pretensioner in order to alert the driver to a vehicle condition requiring immediate attention.

As described above with reference to FIGS. 1-5, an SRS controller may cause actuation of one or more SRS components based on signals received from the vehicle navigation module, vehicle monitoring system or the like. In addition to, or in place of, the pretensioner described above, other SRS components may be actuated by the controller. For example, in one embodiment, a motorized seat belt may be actuated to warn the driver. In this regard, the motorized seat belt may be actuated to apply pretension or by increasing its tensile force based on the driving condition. For example, a particular pre-determined setting may be achieved through actuation if the vehicle is under highway driving conditions. One such motorized seat belt is described in Japanese Publication No. 2002-211355, which is hereby incorporated by reference in its entirety.

As a further example, in one embodiment, a steering wheel vibration mechanism may be actuated to alert the driver. In this regard, the steering wheel may be actuated to cause a vibration when the controller determines that the information from the navigation module or the vehicle monitoring system requires alerting of the driver.

In other embodiments, the SRS component may be an airbag mounted within the seat cushion or in a shoulder belt, as illustrated in FIGS. 6A and 6B, respectively. Referring first to FIG. 6A, a vehicle seat cushion 600 is provided with an airbag 610 in a cavity therein. The airbag is positioned in the front portion of the seat and is adapted to be activated by an airbag controller 620. The airbag controller may receive an actuation signal from the SRS controller, based on the navigation module or the vehicle monitoring system, to place the airbag in a "high alert" mode.

FIG. 6B illustrates an SRS arrangement 630 including a vehicle seat 640 adapted to accommodate a passenger 650 therein. The arrangement 630 includes a safety belt system including a shoulder belt 660 adapted to secure the passenger 650 within the seat 640. The shoulder belt 660 is provided with an airbag 670 (illustrated as deployed in FIG. 6B) which can be deployed in the event of a significant deceleration, for example. In this regard, the SRS controller may transmit a signal to the airbag 670 to place the airbag 670 in a "high alert" mode.

In other embodiments, the navigation module or the vehicle monitoring system may provide information to the SRS controller, resulting in the SRS controller transmitting a signal to actuate an SRS component such as a seat weight sensor. A seat weight sensor may be positioned within a driver or passenger seat to detect the existence or the approximate size of an occupant in the seat. This sensed information may be used to determine, for example, airbag inflation settings appropriate for the passenger or driver seat. For example, when the navigation module indicates that the vehicle is proceeding through a sharply winding road, the SRS controller may actuate the seat weight sensor to shut down the sensing of the weight to avoid an incorrect inflation setting.

Although the above embodiments are described with reference to a navigation module, vehicle monitoring system, an SRS controller and SRS components, it will be understood by those skilled in the art that the functions performed by the various elements can be combined into one or more elements. For example, the navigation module 120 and the SRS controller 110 of FIG. 1 may be combined into a single component which actuates one or more SRS components.

In another embodiment, the navigation module may be adapted to receive signals from hazard signaling units transmitting signals to warn drivers of, for example, a work zone, hazardous road conditions, presence of a school or a hospital or a reduced speed zone. Although referred to as a hazard signaling unit, such units may be adapted to transmit signals informing vehicles of other non-hazardous features, such as an upcoming toll booth, a gas station or a restaurant.

When the navigation module receives such a signal, it may determine whether a reduction in speed or other action may be required by the driver. If such a determination is made, the navigation module transmits a signal to the SRS controller, thereby causing the SRS controller to actuate a safety restraint component, such as a safety belt pretensioner.

In practice, such hazard signaling units may be positioned roadside at either regular intervals or at each position requiring the warning of a hazard. Thus, the units may continuously transmit or broadcast a signal for receipt by approaching vehicles.

In other embodiments, such hazard signaling units may be mounted on vehicles, thus resulting in an arrangement similar to that described above with reference to FIGS. 3 and 4. Thus, each vehicle equipped with such a unit transmits a signal indicating its position and velocity for reception by nearby vehicles. The navigation module of a vehicle receiving the signal may conclude the possibility of a collision with the vehicle transmitting the signal and may accordingly cause the SRS controller to actuate the safety restraint component.

The hazard signaling units are preferably adapted to transmit signals at a predetermined frequency. In this regard, reference may be made to rules adopted by the United States Federal Communications Commission (FCC) on Dec. 17, 2003 (FCC 03-324), designating the 5.9 GHz band for Dedicated Short-Range Communication (DSRC) in the Intelligent Transportation Systems (ITS) Radio Service. This band includes the frequency range of 5.850 GHz to 5.925 GHz.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety restraint system for a vehicle, comprising:
   a safety restraint component coupled to a navigational module, the navigational module being adapted to determine a location of the vehicle;
   wherein the component is adapted to be actuated in response to the location determination made by the module, and
   wherein the component is adapted to be actuated when the navigational module determines the vehicle has entered or is approaching a fixed geographic zone meeting a predefined criteria.

2. The system of claim 1, wherein the safety restraint component is a safety belt pretensioner.

3. The system of claim 1, wherein the safety restraint component is a motorized seat belt adapted to apply pretension to a safety belt.

4. The system of claim 1, wherein the safety restraint component is an airbag system.

5. The system of claim 4, wherein the airbag system includes an airbag in at least one of a seat cushion and a shoulder belt.

6. The system of claim 1, wherein the safety restraint component is a seat weight sensor.

7. The system of claim 1, wherein the safety restraint component is a steering wheel that includes a feature to alert the driver.

8. The system of claim 7, wherein the steering wheel adapted to vibrate upon actuation to alert the driver.

9. The system of claim 1, wherein the navigational module is a GPS-based system.

10. The system of claim 1, wherein the navigational module is a cellular-based system.

11. The system of claim 1, wherein the predefined criteria includes an existence of a school within the zone.

12. The system of claim 1, wherein the predefined criteria includes an existence of a hospital within the zone.

13. The system of claim 1, wherein the navigational module is adapted to determine a location of a second vehicle.

14. The system of claim 13, wherein the navigational system is adapted to determine whether the second vehicle presents a hazard, and to cause actuation of the safety restraint component when the second vehicle is determined to be a hazard.

15. A safety restraint system for a vehicle, comprising:
a safety restraint component coupled to a navigational module, the navigational module being adapted to determine a location of the vehicle;
wherein the component is adapted to be actuated in response to the location determination made by the module,
wherein the component is adapted to be actuated when the navigational module determines the vehicle has entered or is approaching a geographic zone meeting a predefined criteria, and
wherein the zone is a reduced-speed zone.

16. A safety restraint method for use in a vehicle, comprising:
determining a location of the vehicle; and
actuating a safety restraint component in response to the location,
wherein the actuating step is performed when the vehicle is determined to have entered or is approaching a fixed geographical zone meeting a predefined criteria.

17. The method of claim 16, wherein the step of actuating includes actuating a safety belt pretensioner.

18. The method of claim 16, wherein the safety restraint component is a motorized seat belt adapted to apply pretension to a safety belt.

19. The method of claim 16, wherein the safety restraint component is an airbag system.

20. The method of claim 19, wherein the airbag system includes an airbag in at least one of a seat cushion and a shoulder belt.

21. The method of claim 16, wherein the safety restraint component is a seat weight sensor.

22. The method of claim 16, wherein the safety restraint component is a steering wheel adapted to vibrate upon actuation to alert the driver.

23. The method of claim 16, wherein the step of determining includes using a GPS-based system.

24. The method of claim 16, wherein the step of determining includes using a cellular-based system.

25. The method of claim 16, wherein the predefined criteria includes an existence of a school within the zone.

26. The method of claim 16, wherein the predefined criteria includes an existence of a hospital within the zone.

27. The method of claim 16, further comprising the step of determining a location of a second vehicle.

28. The method of claim 16, further comprising the steps of:
determining whether the second vehicle presents a hazard; and
actuating the safety restraint component when the second vehicle is determined to be a hazard.

29. A safety restraint method for use in a vehicle, comprising:
determining a location of the vehicle; and
actuating a safety restraint component in response to the location,
wherein the actuating step is performed when the vehicle is determined to have entered or is approaching a zone meeting a predefined criteria, and
wherein the zone is a reduced-speed zone.

* * * * *